Aug. 14, 1928.

E. W. N. BOOSEY 1,680,279

COVER FOR CONDUIT FITTINGS

Filed May 15, 1925

INVENTOR.
Edward W. N. Boosey
BY
ATTORNEY.

Patented Aug. 14, 1928.

1,680,279

UNITED STATES PATENT OFFICE.

EDWARD W. N. BOOSEY, OF DETROIT, MICHIGAN.

COVER FOR CONDUIT FITTINGS.

Application filed May 15, 1925. Serial No. 30,436.

This invention relates to clean-outs for conduits and the object of the invention is to provide an encased clean-out for the purpose hereinafter described having a cover which may be easily removed to allow access to the clean-out plug. Another object of the invention is to provide a drainage conduit fitting adapted to extend flush with the surface of the street, a removable cover being provided and arranged to prevent possibility of its rusting in place. The usual drainage plug for clean-out fittings is threaded into a receptacle provided therefor embedded in the street or floor of factories and, due to the pressure applied to the cover by heavy wagons and trucks passing thereover, the threads become jammed and prevent removal of the plug. The object of this invention is to provide a construction housing the plug and permitting the same to be readily removed at all times irrespective of the pressure to which the clean-out is subjected by traffic. These objects and the several novel features of the invention are hereinafter more fully described and claimed, and the preferred form of construction by which these objects are attained is shown in the accompanying drawings in which—

Figure 1:
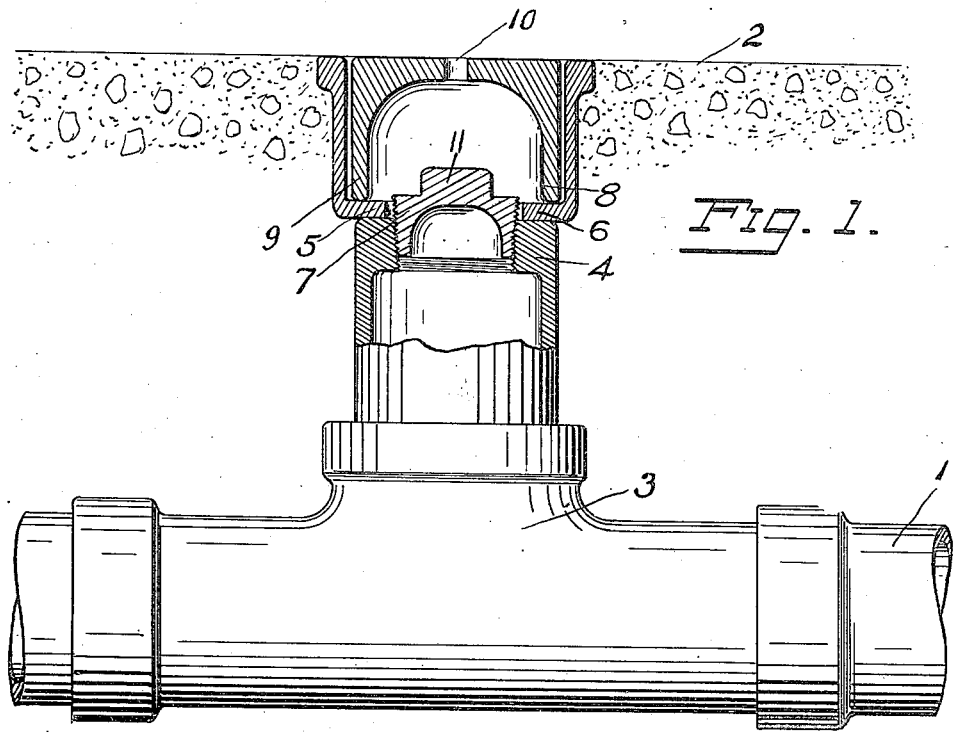
Fig. 1 is a section through a cover for drainage fittings embodying my invention.
Figure 2:
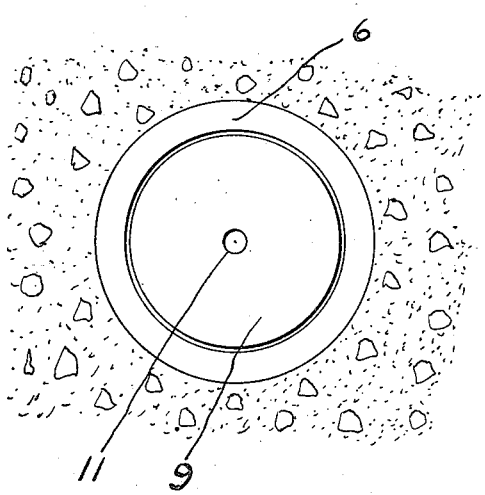
Fig. 2 is a plan view thereof.

It is to be understood that the drainage fitting is adapted for use with drainage lines in the streets of cities or in the floors of factories and the like and heretofore the screw cap providing the clean-out has been at the floor or street level and in position to be mutilated and jammed by street traffic or trucks and the like at the factories. This difficulty is overcome by the arrangement shown in Fig. 1 in which 1 indicates the conduit and 2 the street or floor lever. A T is provided in the conduit having the extension 3 preferably provided with a hub as shown to receive the pipe like fitting 4. This fitting is provided at the upper end with an enlarged cup shaped portion 5 providing an annular shoulder 6. There is a central aperature threaded to receive the usual plug 7 which is preferably of brass or bronze preventing the same from rusting in position in the fitting 4. The upper end of the portion 5 is set flush with the street or floor level 2 and a loose cover 8 is provided preferably of cup shaped form providing an annular flange 9, the lower end of which seats on the shoulder 6 of the member 4. This member 8 has a loose fit in the part 5 of the device and therefore does not rust in place and is of sufficient strength to withstand traffic pressure, and I preferably provide an aperture 10 therein to enable an instrument to be inserted to lift the cover from place when it is desired to clean out the conduit at this point. Upon removal of the cover 10 the plug 7 is exposed, which plug has a lug 11 permitting use of a tool to unscrew the same. The member 8 can be made in any approved form, the essential feature being that the cover 8 must bear on the shoulder 6 outside the plug so that there is no possibility of jamming or mutilating the same.

From the foregoing description it becomes evident that the device is very simple and efficient in operation, will not easily get out of order, is composed of few parts and is of consequent low manufacturing cost and provides a device which accomplishes the objects described.

Having thus briefly described my invention, its utility and mode of operation, what I claim and desire to secure by Letters Patent of the United States is—

1. A fitting for drainage conduits comprising a tubular member adapted for connection with a conduit at one end and having a threaded aperture at the opposite end, a threaded plug for closing the said aperture, and a cover member including an open ended cup shaped member having a central aperture in its bottom greater in diameter than the plug and through which the plug extends, and a second cupped member having an open end seating in the bottom of the cover member about the said plug and the opposite end practically flush with the open end of the cover member, the opposite end of the second member having an aperture of small diameter.

2. A cover for a conduit fitting for positioning in a floor or street surface which comprises in the combination with a drainage fitting positioned below the surface, of a member providing access to the interior of the fitting, and a cover comprising a cup like portion loosely mounted on the end of the said member providing a recess in the floor or street surface, and an unattached inverted cup member within the said portion having its base practically flush with the street surface and its open end disposed downwardly and supported on the bottom of said first cup like portion.

3. A cover for conduit fittings comprising the combination with a drainage fitting, of a tubular member adapted at one end for connection with the fitting and having a central threaded aperture of less diameter at the opposite end providing an annular shoulder, a threaded plug for the said opening extending above the shoulder, and a cover comprising a cup shaped member having an aperture in its bottom slightly greater in diameter than the diameter of the plug and adapted to rest on the shoulder, and an inverted removable cup shaped member loosely positioned in the first named cup member with its bottom edge resting in the bottom of the first named cup member and its upper surface practically flush with the periphery of the first named cup member.

In testimony whereof, I sign this specification.

EDWARD W. N. BOOSEY.